(12) United States Patent
Holz et al.

(10) Patent No.: US 10,198,068 B2
(45) Date of Patent: Feb. 5, 2019

(54) BLINK DETECTION, TRACKING, AND STIMULATION

(71) Applicant: Microsoft Technology Licensing, LLC, Redmond, WA (US)

(72) Inventors: Christian Holz, Redmond, WA (US); Artem Dementyev, Cambridge, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 69 days.

(21) Appl. No.: 15/445,565

(22) Filed: Feb. 28, 2017

(65) Prior Publication Data

US 2018/0246568 A1 Aug. 30, 2018

(51) Int. Cl.
*G09G 5/00* (2006.01)
*G06F 3/01* (2006.01)
*G06K 9/00* (2006.01)
*G06F 3/16* (2006.01)

(52) U.S. Cl.
CPC .............. *G06F 3/013* (2013.01); *G06F 3/016* (2013.01); *G06F 3/167* (2013.01); *G06K 9/00604* (2013.01)

(58) Field of Classification Search
CPC .......... G06F 3/013; G06F 3/167; G06F 3/016; G06K 9/00604
See application file for complete search history.

(56) References Cited

U.S. PATENT DOCUMENTS

| | | | |
|---|---|---|---|
| 5,333,009 A | 7/1994 | Gell, Jr. et al. | |
| 6,270,467 B1 | 8/2001 | Yee | |
| 8,188,990 B2 | 5/2012 | Zamorsky et al. | |
| 9,072,465 B2 | 7/2015 | Pugh et al. | |
| 2003/0040680 A1 | 2/2003 | Hassert et al. | |
| 2007/0171364 A1 | 7/2007 | Beresford | |
| 2014/0336723 A1* | 11/2014 | Ben-Ezra | A61H 5/00 607/45 |
| 2015/0348326 A1* | 12/2015 | Sanders | G06T 19/006 345/633 |

(Continued)

FOREIGN PATENT DOCUMENTS

| | | |
|---|---|---|
| CN | 104142583 A | 11/2014 |
| DE | 102005054317 A1 | 5/2007 |

OTHER PUBLICATIONS

Han, et al., "EyeGuardian: A Framework of Eye Tracking and Blink Detection for Mobile Device Users", In Proceedings of Thirteenth Workshop on Mobile Computing Systems and Applications, Feb. 28, 2012, 6 pages.

(Continued)

*Primary Examiner* — Nelson Rosario
*Assistant Examiner* — Andrew Lee
(74) *Attorney, Agent, or Firm* — Schwegman Lundberg & Woessner, P.A.

(57) ABSTRACT

Systems and methods are disclosed for blink detection, tracking, and stimulation. In one implementation, a device can include a sensor configured to receive an input, the input corresponding to perceiving one or more blinks of an eye of a user. The input can be processed to determine a blink rate or an elapsed time interval since a blink of the user. Based on the blink rate or the elapsed time interval, a blink stimulation action directed to the user can be initiated.

19 Claims, 7 Drawing Sheets

(56) References Cited

U.S. PATENT DOCUMENTS

| | | | |
|---|---|---|---|
| 2015/0356954 A1* | 12/2015 | Lee | G16H 40/63 |
| | | | 345/634 |
| 2016/0022135 A1* | 1/2016 | Agarwal | A61B 3/113 |
| | | | 351/209 |
| 2016/0073874 A1* | 3/2016 | Tsai | A61B 3/113 |
| | | | 600/558 |
| 2016/0259977 A1* | 9/2016 | Asbun | A61B 5/165 |
| 2017/0344109 A1* | 11/2017 | Das | G06F 3/013 |

OTHER PUBLICATIONS

Nusraddinov, et al., "Eye blink based warning system for eye health while using computers", In Proceedings of Medical Technologies National Conference, Oct. 15, 2015, 4 pages.

Blehm, et al., "Computer vision syndrome: a review", In Journal of Survey of ophthalmology, vol. 50, Issue 3, May 2005, 2 pages.

Bulling, et al., "Eye movement analysis for activity recognition using electrooculography", In Journal of IEEE Transactions on Pattern Analysis and Machine Intelligence archive, vol. 33 issue 4, Apr. 2011, pp. 741-753.

Cadenhead, et al., "Modulation of the startle response and startle laterality in relatives of schizophrenic patients and in subjects with schizotypal personality disorder: evidence of inhibitory deficits", In Journal of American Journal of Psychiatry, Oct. 2000, pp. 1660-1668.

Castro, Fabio Lo, "Class I infrared eye blinking detector", In Journal of Sensors and Actuators A: Physical, vol. 148, issue 2, Dec. 3, 2008, 3 pages.

Chau, et al., "Real time eye tracking and blink detection with usb cameras", In Technical Report of Boston University Computer Science Technical Report No. 2005-12, May 12, 2005, pp. 1-11.

Crnovrsanin, et al., "Stimulating a blink: reduction of eye fatigue with visual stimulus", In Proceedings of the SIGCHI Conference on Human Factors in Computing Systems, Apr. 26, 2014, pp. 2055-2064.

Crook, Jordan, "The Google Glass Wink Feature Is Real", In, May 9, 2013, 13 pages.

Divjak, et al., "Eye Blink Based Fatigue Detection for Prevention of Computer Vision Syndrome", In Journal of IAPR Conference on Machine Vision Applications, May 20, 2009, pp. 350-353.

Freudenthaler, et al., "Characteristics of spontaneous eyeblink activity during video display terminal use in healthy volunteers", In Journal of Graefe's archive for clinical and experimental ophthalmology, vol. 241, Issue 11, Nov. 1, 2003, 7 pages.

Holly, et al., "Tear physiology and dry eyes", In Journal of Survey of Ophthalmology, vol. 22, Issue 2, Sep. 1977, 3 pages.

Ishimaru, et al., "Smarter eyewear: using commercial EOG glasses for activity recognition", In Proceedings of the ACM International Joint Conference on Pervasive and Ubiquitous Computing: Adjunct Publication, Sep. 13, 2014, pp. 239-242.

Javadi, et al., "Dry eye syndrome", In Journal of Ophthalmic & Vision Research, vol. 6, issue 3, Jul. 2011, pp. 192-198.

Johnston, et al., "The Interblink Interval In Normal and Dry Eye Subjects", In Journal of Clinical Ophthalmology, Jan. 31, 2013, pp. 253-259.

Kassner, et al., "Pupil: an open source platform for pervasive eye tracking and mobile gaze-based interaction", In Proceedings of the ACM Conference on Ubiquitous Computing, Sep. 13, 2014, pp. 1151-1160.

Kernan, Lisa, "Coming attractions: Reading American movie trailers", In Publication of University of Texas Press, Jul. 21, 2009, 6 pages.

Kojima, et al., "A new noninvasive tear stability analysis system for the assessment of dry eyes", In Journal of Investigative ophthalmology & visual science, vol. 45, Issue 5, May 1, 2004, pp. 1369-1374.

Kugelberg, Eric, "Facial reflexes", In Journal of Brain Neurology, Sep. 1, 1952, 5 pages.

Li, et al., "openEyes: a low-cost head-mounted eye-tracking solution", In Proceedings of the symposium on Eye tracking research & applications, Mar. 27, 2006, 7 pages.

Liu, et al., "Reflex blink to visual threat", In Journal of Neuro-Ophthalmology vol. 12, Issue 1, Mar. 1992, pp. 47-56.

Mandelcorn, et al., "Problems with punctal plugs", In Archives of Ophthalmology vol. 107, Issue 4, Apr. 1989, 3 pages.

Manning, et al., "Reflex eyeblinks and visual suppression", In Journal of Perception & Psychophysics, vol. 34, Issue 3, May, 1983, pp. 250-256.

Miljanovic, et al., "Impact of dry eye syndrome on vision-related quality of life", In American Journal of Ophthalmology, vol. 143, Issue 3, Mar. 2007, pp. 1-11.

Miura, et al., "Effect of a light-emitting timer device on the blink rate of non-dry eye individuals and dry eye patients", In British Journal of Ophthalmology, Mar. 15, 2013, 2 pages.

Nosch, et al., "Blink Animation Software to Improve Blinking and Dry Eye Symptoms", In Journal of Optometry & Vision Science vol. 92, Issue 9, Sep. 2015, 2 pages.

"Digital Day", https://www.ofcom.org.uk/research-and-data/cmr/cmr16/digital-day, Published on: Aug. 4, 2016, 1 pages.

Portello, et al., "Blink rate, incomplete blinks and computer vision syndrome.", In Journal of Optometry & Vision Science vol. 90, issue 5, May, 2013, 2 pages.

Rodriguez, et al., "Investigation of extended blinks and interblink intervals in subjects with and without dry eye", In Journal of Clinical Opthaalmology, Feb. 13, 2013, pp. 337-342.

Rushworth, Geoffrey, "Observations on blink reflexes", In Journal of Neurology, Neurosurgery & Psychiatry vol. 25, Issue 2, May, 1962, pp. 93-108.

Schlote, et al., "Marked reduction and distinct patterns of eye blinking in patients with moderately dry eyes during video display terminal use", In Graefe's Archive for Clinical and Experimental Ophthalmology, vol. 242, Issue 4, Apr. 2004, 5 pages.

Starner, Thad, "Project glass: An extension of the self", In Journal of IEEE Pervasive Computing vol. 12, Issue2, Apr. 18, 2013, pp. 14-16.

Tai, et al., "The clinical efficacy of silicone punctal plug therapy", In Journal of Cornea vol. 21, Issue 2, Mar. 2002, 2 pages.

Vanderwerf, et al., "Eyelid movements: behavioral studies of blinking in humans under different stimulus conditions", In Journal of neurophysiology vol. 89, Issue 5, May 1, 2003, pp. 2784-2796.

Wilson, Mark, "Wink Glasses Will Make You Blink", http://gizmodo.com/5326261/wink-glasses-will-make-you-blink, Published on: Jul. 30, 2009, 2 pages.

Yan, et al., "Computer Vision Syndrome: A widely spreading but largely unknown epidemic among computer users", In Journal of Computers in Human Behavior, vol. 24, Issue 5, Sep. 2008, 2 pages.

Yates, et al., "Light-stimulus-evoked blink reflex Methods, normal values, relation to other blink reflexes, and observations in multiple sclerosis", In Journal of Neurology vol. 31, Issue 3, Mar. 1981, 1 pages.

* cited by examiner

BLINK DETECTION, TRACKING, AND STIMULATION

TECHNICAL FIELD

Aspects and implementations of the present disclosure relate to data processing and, more specifically, but without limitation, to the blink detection, tracking, and stimulation.

BACKGROUND

Computer Vision Syndrome (CVS) (also known as Digital Eye Strain) refers to eye and/or vision-related problems (e.g., dry eyes, blurry vision, fatigue, etc.) that can be experienced as a result of lengthy, ongoing exposure to devices such as computers, tablets, smartphones, etc. Many of these problems occur as a result of users not blinking frequently enough while viewing such devices. With the increasing proliferation and usage of the referenced devices, incidence of CVS is also increasing across many populations.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, a device can include a sensor configured to receive an input, the input corresponding to perceiving one or more blinks of an eye of a user. The input can be processed to determine a blink rate of the user. Based on the blink rate, a blink stimulation action directed to the user can be initiated.

In another aspect of the present disclosure, a device can include a sensor configured to perceive one or more blinks of an eye of a user. An input can be received from the sensor. The input can be processed to determine an elapsed time interval since a blink of the user. Based on the elapsed time interval, a blink stimulation action can be initiated.

In another aspect of the present disclosure, a device can include a first sensor configured to receive an input, the input corresponding to perceiving one or more blinks of an eye of a user, and a second sensor configured to perceive an item towards which the eye of the user is directed. The device can also include one or more actuators. The input can be processed to determine a blink rate or an elapsed time interval since a blink of the user. Based on the blink rate or the elapsed time interval and the item towards which the eye of the user is directed, a first blink stimulation action directed to the user can be initiated. Such a first blink stimulation action can activate the actuator.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to blink detection, tracking, and stimulation.

It can be appreciated that Computer Vision Syndrome (CVS) is experienced by many users of digital devices (e.g., computers, tablets, smartphones, etc.), resulting in ee/vision-related problems such as dry eyes, blurry vision, fatigue, etc. While various technologies are capable of perceiving when a user is blinking, such technologies utilize these determinations to initiate commands (e.g., to capture a picture or make a selection in response to a 'wink' of an eye of the user). However, these technologies do not address or prevent the problems associated with CVS from occurring.

Accordingly, described herein in various implementations are technologies, including devices/systems, methods, and machine readable mediums, that enable the blinks of a user to be monitored and/or tracked. By tracking such blinks, a blink rate or a delay/time interval since a previous blink can be computed for the user. Upon determining that the blink rate of a user has fallen below a defined threshold (e.g., 15 blinks per minute), various blink stimulation action(s) can be initiated (e.g., using various actuators such as are described herein). Alternatively, upon determining that the referenced blink delay/time interval since the last detected blink exceeds a defined threshold (e.g. a 20 second maximum delay in between blinks), blink stimulation action(s) can be initiated. Examples of such blink stimulation actions include but are not limited to: illumination actions (e.g., flashing light towards the eye(s) of the user), haptic actions (e.g., tapping, poking, etc., near the eye of the user), pneumatic actions (e.g., pressurizing and releasing puffs of air near the eye of the user), etc., in order to stimulate blinking. In doing so, the problems associated with CVS can be reduced in a manner that is relatively unobtrusive to the user.

It can therefore be appreciated that the described technologies are directed to and address specific technical challenges and longstanding deficiencies in multiple technical areas, including but not limited to sensor perception, blink tracking, image processing, and physical stimulation. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

Figure 1:
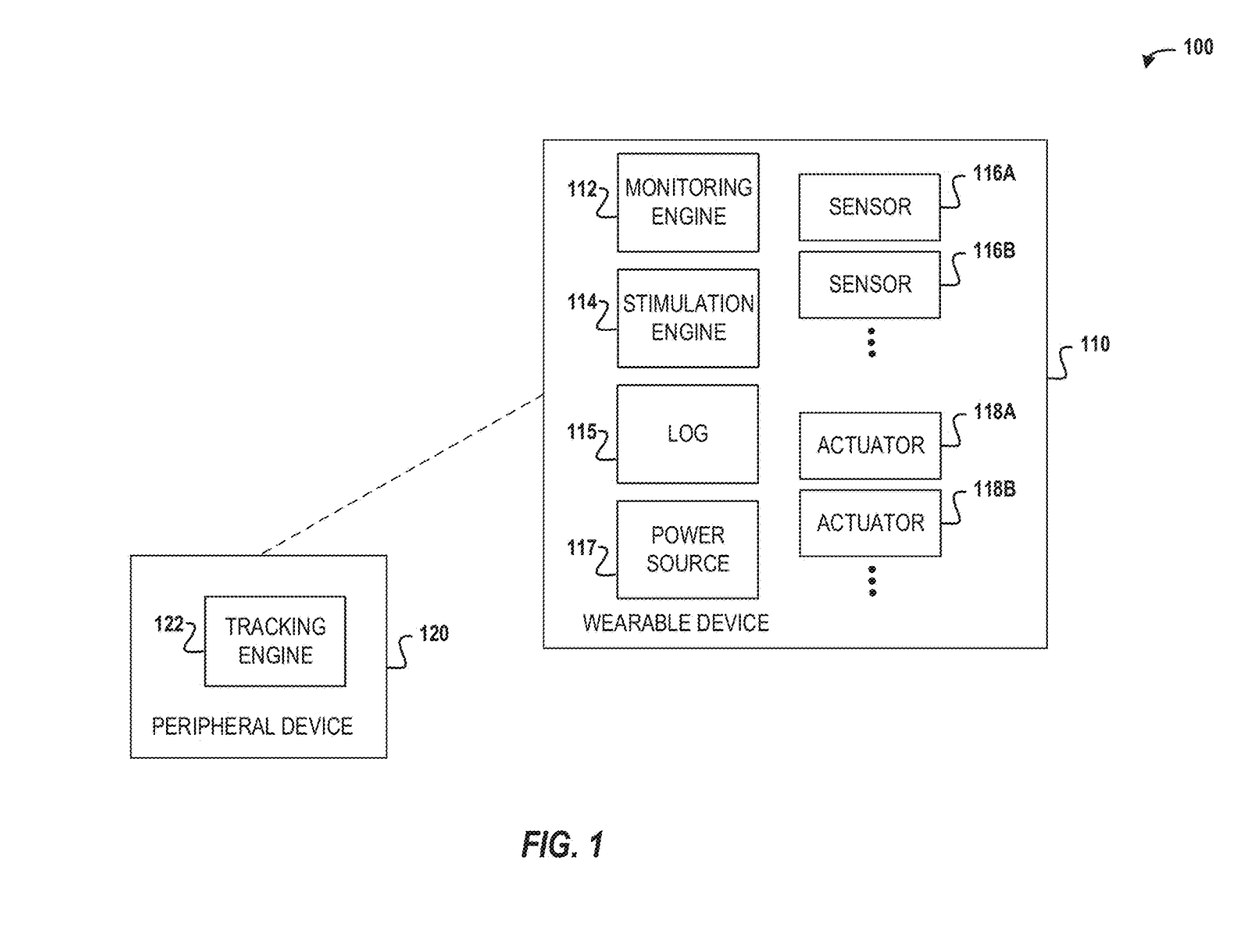
FIG. 1 is a block diagram of a system, according to an example embodiment.

FIG. 1 illustrates an example system 100, in accordance with some implementations. As shown, the system 100 includes wearable device 110. Wearable device 110 can be a device that can attach to a pair of eyeglasses/eyeglass frames and/or can otherwise be integrated into a pair of eyeglasses/frames. Additionally, in certain implementations wearable device 110 can be a virtual reality (VR) and/or augmented reality (AR) headset. Such a headset can include any head-mounted, head-worn, etc. devices (as well as ski helmets, masks, etc.). In yet other implementations, wearable device 110 can be implemented in conjunction with a laptop computer, a desktop computer, a terminal, a mobile phone, a tablet computer, a smart watch, a personal digital assistant (PDA), a digital music player, a server, and the like.

In certain implementations, wearable device 110 can include or otherwise incorporate various components such as one or more sensor(s) (e.g., sensor 116A and sensor 116B as shown in FIG. 1, collectively sensors 116). Such sensors can be optical sensors (e.g., camera(s), infrared sensor(s), etc.) that can be configured or positioned to perceive and/or track various visual phenomena, such as an instance of a user blinking his/her eye(s). For example, an infrared reflectance sensor (which can incorporate both an infrared LED and a phototransistor) can be utilized to measure/detect changes in the reflectance of illuminated infrared light. Being that the reflectance of such illuminated infrared light differs between the eyeball and the eyelid of a user, detecting such change(s) can indicate that a blink has occurred. In other implementations various other types of sensors can be used, such as ultrasonic sensors. Additionally, in certain implementations such sensors can be configured or positioned to perceive and/or track various other phenomena, such as activities that the user can be engaged in, content that the user can be viewing, etc. It should be understood that while FIG. 1 depicts sensor 116A and sensor 116B as components of wearable device 110, in certain implementations one or more of the referenced sensor(s) can be peripheral sensors (e.g., an external/separate camera device) that is connected to and/or otherwise configured to operate in conjunction with wearable device 110. Other types of sensors can also be utilized. For example, other types of motion-sensing sensors can be utilized. Additionally, in certain implementations electromyogram (EMG) can be used, e.g., to detect blinks through muscle activation. In certain implementations, various audio sensor(s) can be utilized, e.g., to detect, perceive, etc. audio signals that correspond to blinking.

Wearable device 110 can include or otherwise incorporate various components such as one or more actuator(s) (e.g., actuator 118A and actuator 118B as shown in FIG. 1, collectively actuators 118). In certain implementations, such actuators can be components that create or otherwise initiate various stimuli, such as stimuli that can cause a user to blink his/her eye(s). Examples of such actuators include but are not limited to: visual actuators, physical/haptic actuators, pneumatic actuators, and auditory actuators.

The referenced visual actuators can be, for example, various components that create various visual stimuli that cause a user to blink. For example, an LED (or any other such light source) can be positioned such that, when triggered/initiated, it flashes light (e.g., a 'flash' of brief, high-intensity illumination) towards the eye(s) of the user. Additionally, as noted above, in certain implementations wearable device 110 can be an AR/VR headset, in which case the referenced visual actuator can be implemented in a manner whereby content that is likely to stimulate blinking (e.g., bright light/colors, sudden or abrupt content changes, notifications/reminders, etc.) can be presented within the AR/VR environment to the user (via the referenced headset).

Figure 2A:
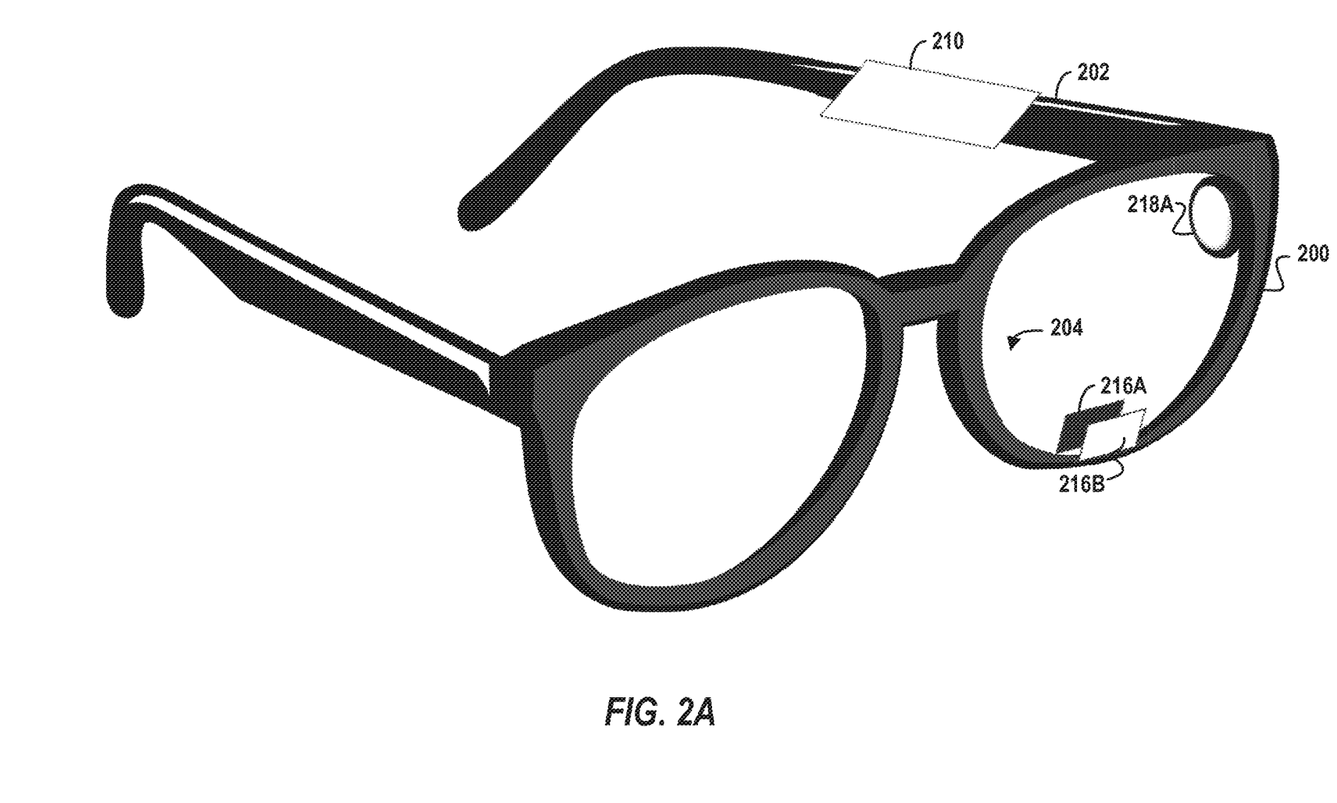
FIG. 2A depicts an example implementation of a described wearable device.

By way of illustration, FIG. 2A depicts an example implementation of the described wearable device. As shown in FIG. 2A, the wearable device can be attached/configured with respect to a pair of eyeglasses 200 (though it should be understood that in other implementations, the described components can be integrated into a single wearable computing device). Various components of the wearable device (e.g., the monitoring engine and stimulation engine) can be included within housing 210 which can be attachable to (or otherwise integrated within) eyeglasses 200, e.g., at temple 202. Various sensors can be affixed to (or otherwise integrated within) eyeglasses 200, such as on lens 204. For example, sensor 216A can be affixed to the inside of lens 204, and can be an optical sensor (e.g., an infrared sensor) that is positioned and/or otherwise configured to monitor the blinking (and/or other movements/activities) of the eye(s) of the wearer of eyeglasses 200. Additionally, sensor 216B can be affixed to the outside of lens 204. Such sensor 216B can be an optical sensor positioned and/or otherwise configured to monitor activities, occurrences, and/or content that the eye(s) of the wearer of eyeglasses 200 are looking towards (e.g., to determine whether the user is reading, driving, watching a video, etc.).

Actuator 218A can also be attached to eyeglasses 200. Such an actuator can be an LED light directed towards the eye(s) of the wearer of eyeglasses 200. For example, upon detecting (based on inputs originating from sensor 216A) that the user is not blinking at or above a certain rate, actuator 218A can be triggered, and can flash light (e.g., brief, high-intensity illumination) one or more times towards the eye(s) of the user, in order to stimulate blinking.

The referenced physical/haptic actuators can be, for example, various components that create various physical stimuli that cause a user to blink. For example, a linear servomotor can be positioned to gently tap, poke, etc. certain regions of the face of the user, e.g., near the eye, in order to stimulate blinking. By way of further example, in certain implementations such actuator(s) can include conductive pads/contacts which enable electrical muscle stimulation. Such pads can be positioned in various regions (e.g., near the eye of the user, behind the ear of the user, etc.), in order to stimulate various facial muscles that induce blinking.

Figure 2B:
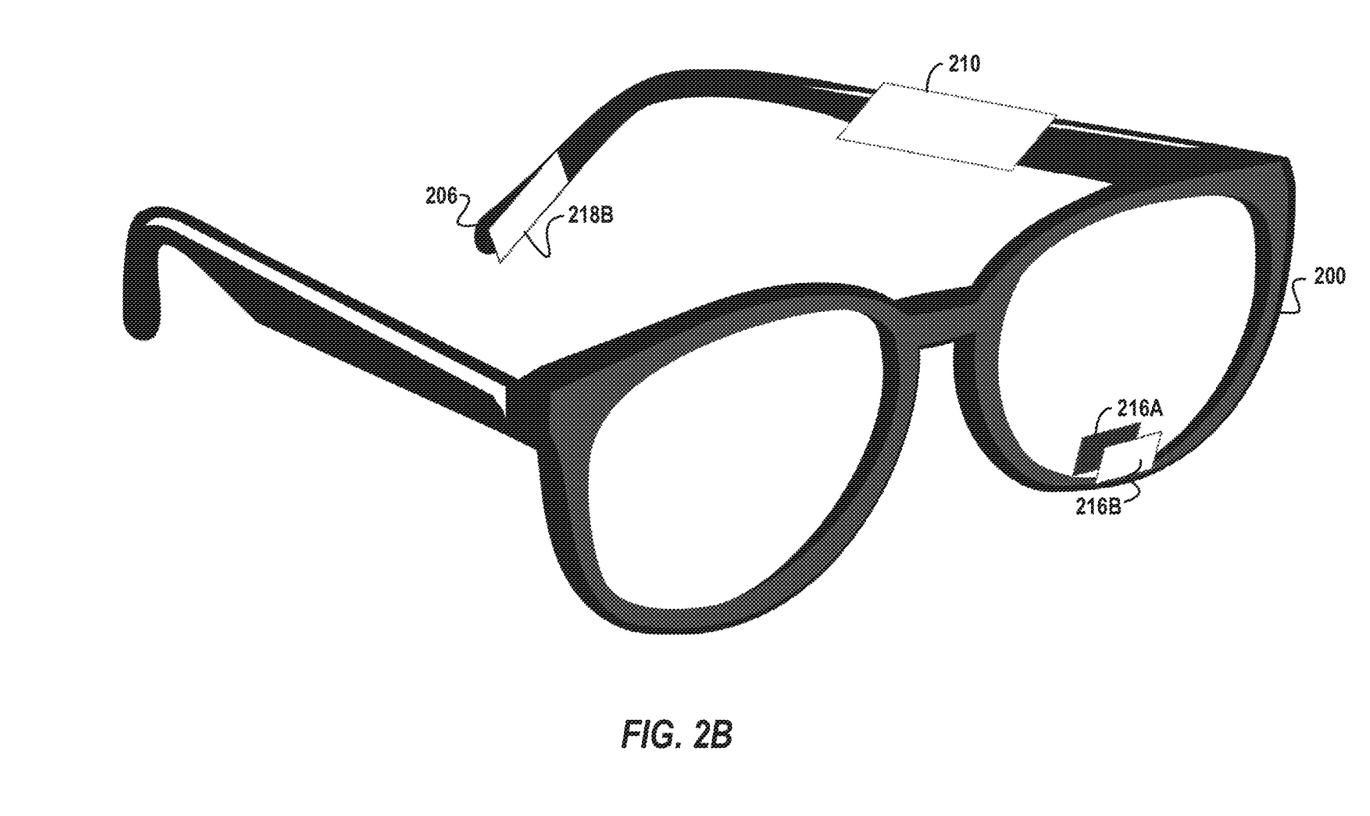
FIG. 2B depicts another example implementation of a described wearable device.

By way of further illustration. FIG. 2B depicts an example implementation of the described wearable device in conjunction with a physical actuator 218B. As shown in FIG. 2B, actuator 218B can be attached or otherwise affixed to eyeglasses 200 at temple tip/earpiece 206. As noted above, actuator 218B can be a conductive pad that stimulates one or more facial muscles of the wearer of eyeglasses 200 (e.g., upon detecting that the user is not blinking at or above a certain rate), in order to stimulate blinking.

The referenced pneumatic actuators can be, for example, various components that can pressurize and release puffs of air in order cause a user to blink. For example, a piezoelectric blower can be positioned to blow puffs of air towards certain regions of the face of the user, e.g., near the eye, in order to stimulate blinking. By way of further example, a solenoid or vibration motor (e.g., a Linear Resonant Actuator (LRA)) can be used.

Figure 2C:
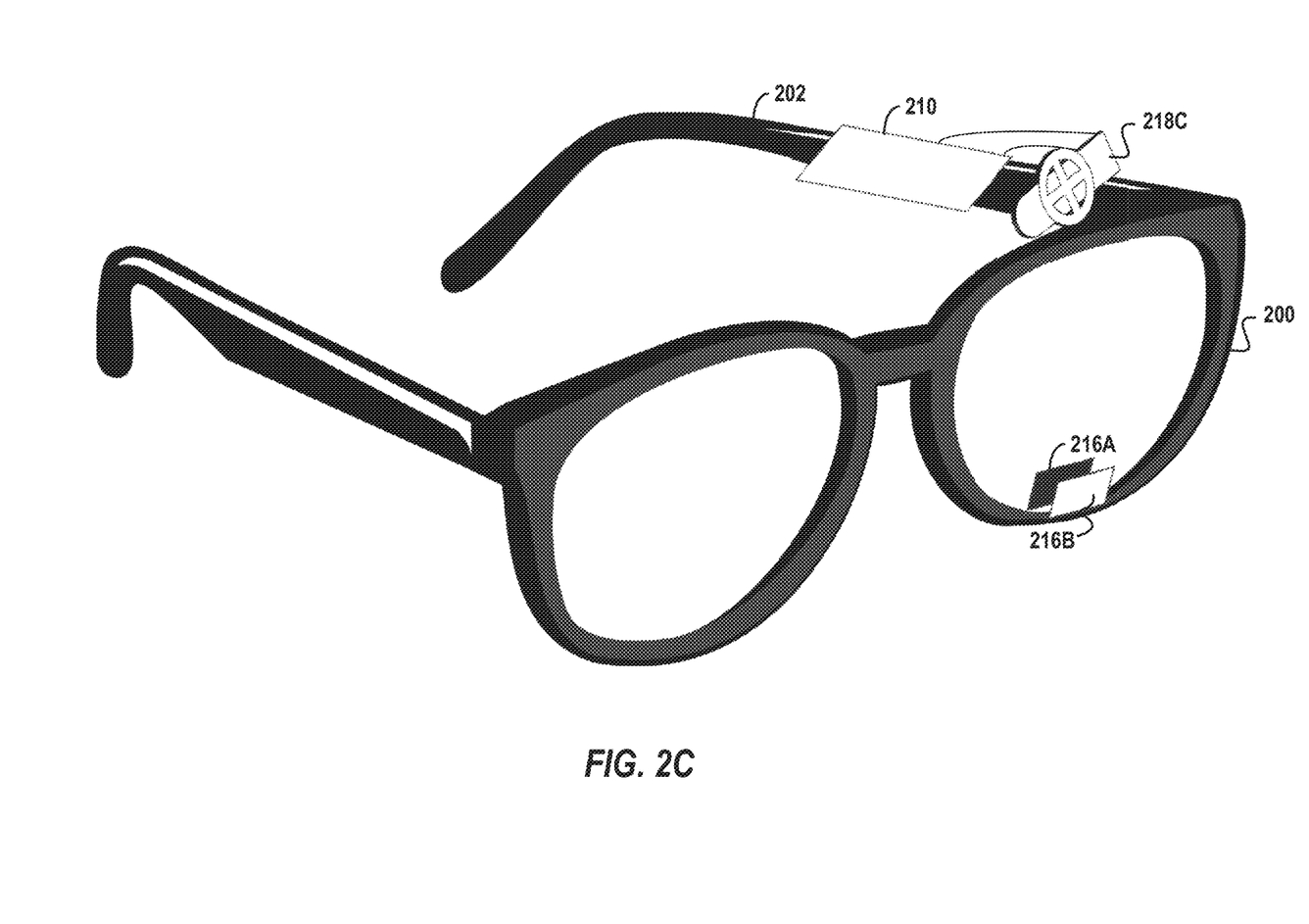
FIG. 2C depicts another example implementation of a described wearable device.

By way of yet further illustration, FIG. 2C depicts an example implementation of the described wearable device in conjunction with a pneumatic actuator 218C. As shown in FIG. 2C, actuator 218C can be attached or otherwise affixed to eyeglasses 200 at temple 202. As noted above, actuator 218B can be a piezoelectric blower that blows puffs of air towards certain regions of the face of the wearer of eyeglasses 200 (e.g., upon detecting that the user is not blinking at or above a certain rate), in order to stimulate blinking. Additionally, in certain implementations the actuator can be affixed to eyeglasses 200 (e.g., using a hinge or other such adjustable connector) such that the angle at which the actuator 218C blows can be adjusted).

It should also be noted that the described actuators are exemplary and that any number of additional actuators can also be implemented. For example, an auditory actuator (e.g., a speaker device worn by the user and/or an external or separate speaker) can be configured to project sound (e.g., towards the ears of the user), such as sound(s) that can induce the user to blink. Such auditory actuation can, for example, project a loud sound that can startle a user and trigger the user to blink. Such auditory actuation can also, for example, be an audio notification, instruction, etc. to 'blink.' Such instruction can, for example, be repeated until the user is determined to have blinked (e.g., in a manner described herein). It should be understood that, in certain implementations such a determination can be computed, for example, based on motion detected with respect to a head of a user. For example, blinking may cause subtle shifts, movements, etc., with respect to the head and/or skin of a user. Accordingly, by detecting/perceiving such motion, it can be determined that a user has blinked.

Figure 5:
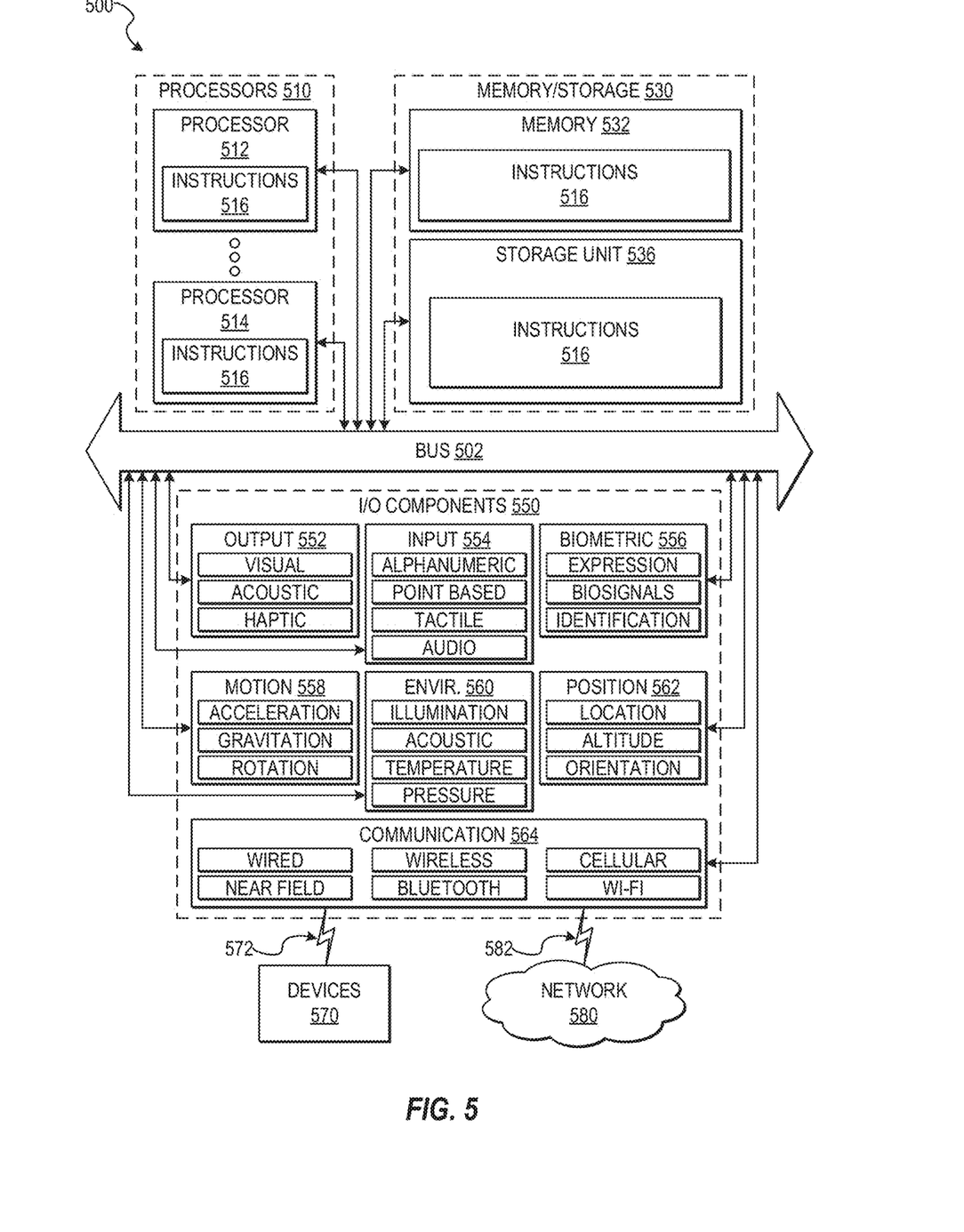
FIG. 5 is a block diagram illustrating components of a machine able to read instructions from a machine-readable medium and perform any of the methodologies discussed herein, according to an example embodiment.

As also shown in FIG. 1, wearable device 110 can also include monitoring engine 112 and stimulation engine 114. Each of monitoring engine 112 and stimulation engine 114 can be, for example, an application, module, or any other such instructions stored on wearable device 110 (e.g., in memory of wearable device 110, such as memory 530 as depicted in FIG. 5 and described in greater detail below). When executed (e.g., by one or more processors of wearable device 110 such as processors 510 as depicted in FIG. 5 and described in greater detail below), such application, module, etc., configures/enables the device to perform various operations such as are described herein. In other implementations, wearable device can include or otherwise incorporate dedicated circuitry that configures the device to perform the referenced operations, as described herein.

Monitoring engine 112 can configure or enable wearable device 110 to monitor various aspects of the blinking of the eye(s) of a user. In certain implementations, monitoring engine 112 operates in conjunction with various sensors 116, such as in order to detect and/or otherwise determine whether the user is blinking and how often they are blinking (e.g., the rate at which they are blinking).

Stimulation engine 114 can configure or enable wearable device 110 to stimulate blinking of the eye(s) of a user, e.g., in response to a determination that the user has not/is not blinking at a certain rate. In certain implementations, stimulation engine 114 operates in conjunction with various actuators 118, such as in order to initiate various blink stimulation action(s) in order to cause the user to blink.

Wearable device 110 can also include log 115. Log 115 can be, for example, a database or repository that stores various information, including but not limited to records pertaining to the manner in which the user is (or is not) blinking his/her eye(s). By way of illustration, log 115 can be a blink log that maintain records that include timestamps (reflecting, for example, a date and time) of various instances at which the user is determined to have blinked. As described herein, a blink rate of such a user can be computed (e.g., blinks per minute, hour, etc.), and various stimulation actions can be initiated (e.g., in a scenario in which the blink rate of a user is determined to be below a defined threshold).

In certain implementations log 115 can be stored in memory of wearable device 110 (such as memory 530 as depicted in FIG. 5 and described in greater detail below).

Additionally, wearable device 110 can also include power source 117. Power source 117 can be, for example, a battery (e.g., an alkaline battery, a lithium-ion battery, etc.) that can be used to power the various components of wearable device 110 (sensors, actuators, etc.).

As also shown in FIG. 1, in certain implementations wearable device 110 can be connected to and/or otherwise in communication with peripheral device 120 (e.g., via one or more communication interfaces such as Bluetooth, etc.). Peripheral device 120 can be, for example, a laptop computer, a desktop computer, a terminal, a mobile phone, a tablet computer, a smart watch, a personal digital assistant (PDA), a digital music player, a server, or the like. In certain implementations, peripheral device 120 can execute various applications or modules such as tracking engine 122. In certain implementations, tracking engine 122 can track various monitoring and/or stimulation-related information (e.g., a historical blink rate of a user over time) and can also provide various interfaces (e.g., a visual interface such as a touchscreen) with respect to which such information can be viewed. Additionally, in certain implementations peripheral device 120 can generate and transmit instructions that configure various aspects of the operation of wearable device 110. Such instructions can, for example, enable the user to review and/or adjust certain settings, parameters, etc., of wearable device 110 (e.g. the blink rate threshold above which a blink should be stimulated, the frequency and/or intensity of such stimulation, etc.), as described herein).

At this juncture it should be noted that while many of the examples described herein are illustrated with respect to a single device (e.g., wearable device 110), this is simply for the sake of clarity and brevity. However, it should be understood that the described technologies can also be implemented (in any number of configurations) across multiple devices. For example, sensors 116, actuators 118, monitoring engine 112, stimulation engine 114, etc., can each be implemented in a separate device or component.

Further aspects and features of wearable device 110 are described in more detail in conjunction with FIGS. 2A-5, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 3:
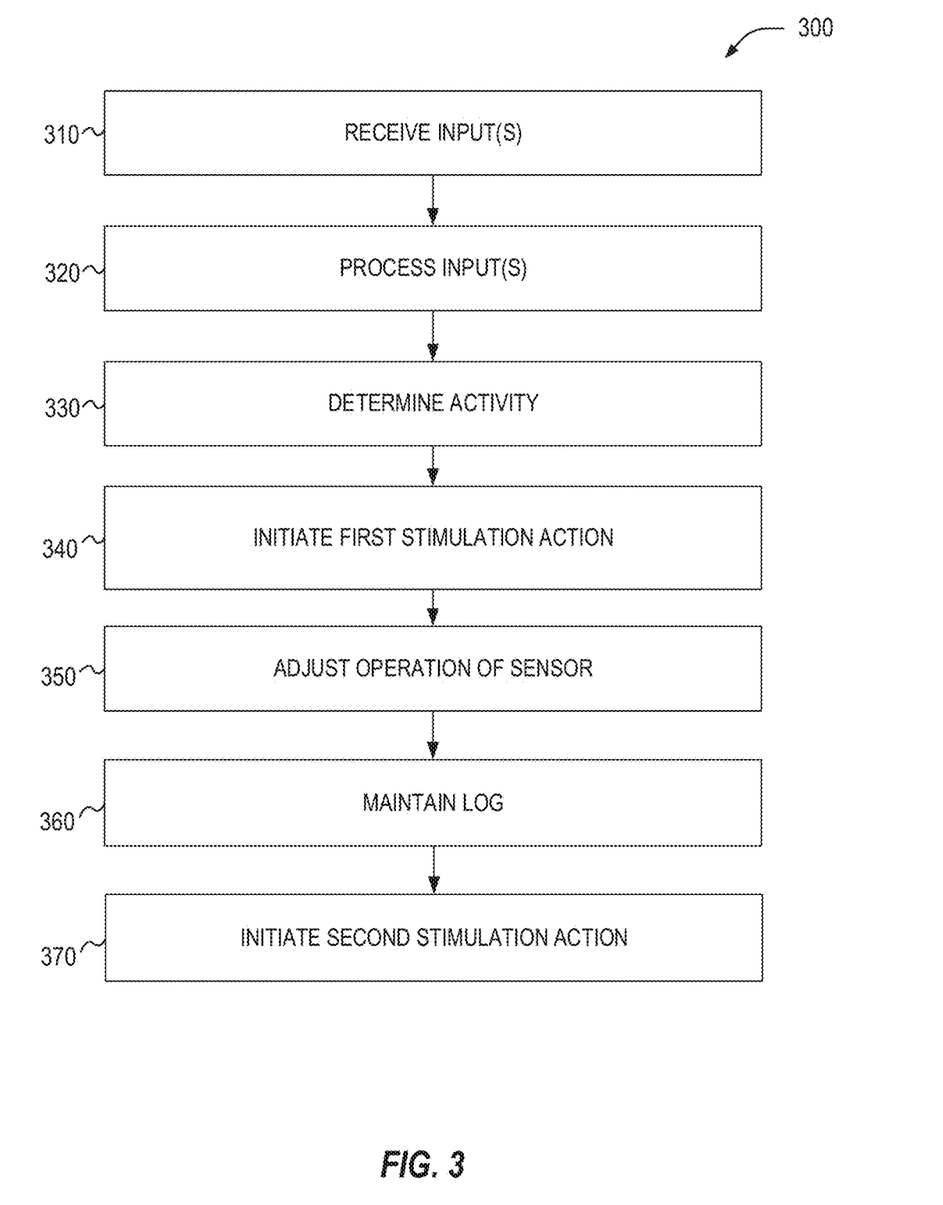
FIG. 3 is a flow chart illustrating a method, in accordance with an example embodiment, for blink detection, tracking, and stimulation.

FIG. 3 is a flow chart illustrating a method 300, according to an example embodiment, for blink detection, tracking, and stimulation. The method is performed by processing logic that can comprise hardware (circuitry, dedicated logic, etc.), software (such as is run on a computing device such as those described herein), or a combination of both. In one implementation, the method 300 is performed by one or more elements depicted and/or described in relation to FIG. 1 and/or FIGS. 2A-2C (including but not limited to wearable device 110). In some other implementations, the one or more blocks of FIG. 4 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 4:
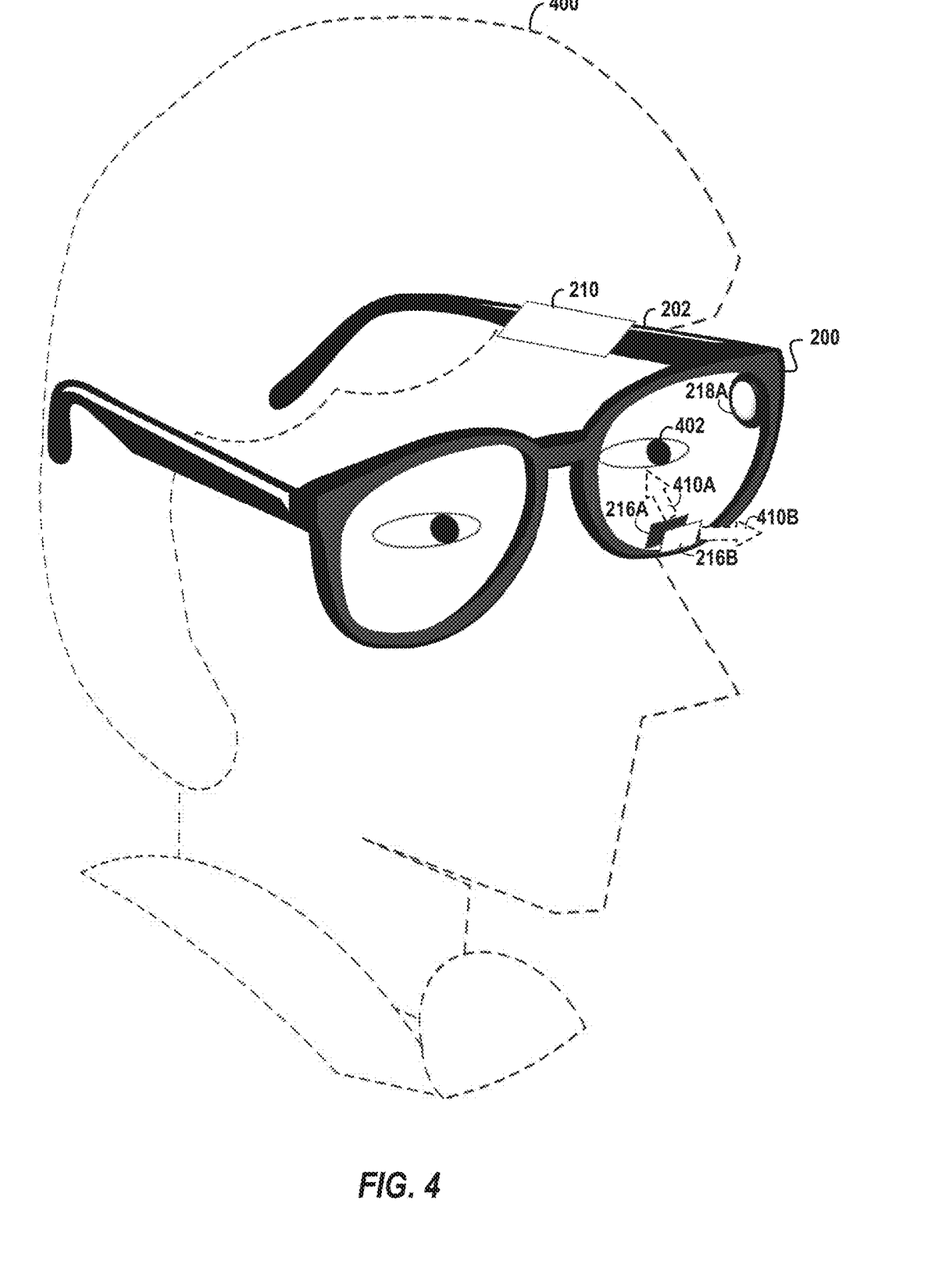
FIG. 4 illustrates one example scenario described herein, according to an example embodiment.

At operation 310, one or more inputs can be received. In certain implementations, a first sensor can be configured to receive such input(s). Additionally, in certain implementations the referenced input(s) can correspond to the perceiving of one or more blinks of an eye of a user. For example, FIG. 4 depicts an example scenario in which user 400 is wearing eyeglasses 200 which include and/or are otherwise configured with the described wearable device (as described above, e.g., with respect to FIG. 2A). As shown in FIG. 4, sensor 216A (e.g., an optical sensor such as an infrared sensor) can be positioned (e.g., angled or oriented towards/in the direction of arrow 410A) to receive inputs, such as those that correspond to a perception and/or detection of movement or other such phenomena occurring with respect to eye 402 of user 400. For example, sensor 216A can receive an input that corresponds to a perception/detection that user 400 has blinked eye 402. Receipt of such input(s) (e.g., by the referenced sensor) can be further transmitted to/received by monitoring engine 112 of wearable device 110. It should be understood that, in certain implementations, sensor 216A can monitor the blinking of eye 402 in a periodic and/or ongoing basis. In certain implementations, various aspects of operation 310 can be performed by wearable device 110 and/or monitoring engine 112. In other implementations such aspects can be performed by one or more other elements/components, such as those described herein.

At operation 320, one or more inputs (such as those received at operation 310) can be processed. In doing so, a blink instance can be detected or otherwise determined. In certain implementations, an amount of time that has elapsed, e.g., since a previous blink instance can also be determined. For example, having detected a blink instance, a timer can be used to determine the amount of time (e.g., 15 seconds) that has elapsed since the blink instance occurred. Additionally, in certain implementations a blink rate of the user can be determined and/or otherwise computed. For example, the various input(s) received at/from sensor(s) 116 (which can correspond to instances of blinking) can be stored in log 115. Such input(s) can include and/or otherwise be associated with timestamps which reflect the time that the corresponding blink occurred (e.g., at 3:53:26 on Jan. 16, 2017). Accordingly, upon receiving several such input(s), the blink rate of the user (as reflected, for example, in blinks per minute) can be computed. It should be understood that such inputs can also be used to compute various additional metrics, e.g., a duration of time that has transpired since the last observed blink. In certain implementations, various aspects of operation 320 can be performed by wearable device 110 and/or monitoring engine 112. In other implementations such aspects can be performed by one or more other elements/components, such as those described herein.

At operation 330, an activity that the user is engaged in can be determined. That is, it can be appreciated that users performing different activities (e.g., reading, driving, watching videos, etc.) can exhibit different blink rates or intervals/delays between blink instances. Additionally, in certain scenarios it may be more or less desirable to stimulate blinking. For example, if the user is driving it may not be desirable to frequently attempt to stimulate blinking if such stimulation may distract the user. Accordingly, as noted above, in certain implementations the described wearable device can further include additional sensor(s) configured to detect various activities, items, content, etc., towards which the eye of the user is directed. In certain implementations, the determination of such an activity can include the detection of a display or other such device in close proximity to the face of the user. For example, optical sensor(s) facing away from the face/eyes of the user (e.g., sensor 216B) can be configured to detect electromagnetic radiation originating from such display device(s). In certain implementations, various aspects of operation 330 can be performed by wearable device 110 and/or monitoring engine 112. In other implementations such aspects can be performed by one or more other elements/components, such as those described herein.

By way of illustration, FIG. 4 depicts sensor 216B affixed to eyeglasses 200. Sensor 216B can be, for example, an optical sensor (e.g. a camera) that is directed towards and/or otherwise positioned in direction 410B (i.e., in the direction towards which the eye(s) 402 of the user 400 are looking). Inputs received from such sensor 216B can be processed (e.g., using various image processing techniques such as optical character recognition (OCR), object recognition, etc.) to determine what user 400 is looking at. For example, it can be determined that the user is looking at text (e.g., while reading), content that is frequently changing within a particular frame/region (e.g., while watching a video), a road and/or vehicles (e.g., while driving), etc. Additionally, as noted above, in certain implementations sensor 216B can be configured to detect electromagnetic radiation originating from display device(s) towards which the user is looking.

Additionally, in certain implementations the activity in which the user is engaged can be further determined based on inputs received from sensor(s) that are directed towards the eye(s) of the user (e.g., sensor 216A as shown in FIG. 4, which is oriented in direction 410A to detect the blinking of eye 402). For example, sensor 216A (e.g., an optical sensor) can detect or otherwise determine the motion in which the eye(s) (e.g., the pupil or iris of the eye(s)) are moving. Such motion can also reflect various activities that the user can be engaged in. For example, repeated left-to-right motion can reflect that the user is reading while ongoing focus in a single direction can reflect that the user is watching a video.

At operation 340, a first blink stimulation action can be initiated (e.g., a blink stimulation action directed to/towards the user, such as towards the eye, face, head, etc., of the user). In certain implementations, such a blink stimulation action can be initiated based on the blink rate or the delay/interval since the last detected blink instance (e.g., as computed at operation 320). It should be understood that, in certain implementations, a blink rate threshold can be defined. Such a threshold can reflect a minimum blink rate (e.g., 15 blinks per minute) below which blinking should be stimulated. Accordingly, upon computing the referenced blink rate for a user and determining that such blink rate falls below the referenced threshold, one or more blink stimulation actions can be initiated. Moreover, in other implementations a blink delay/interval threshold can be defined. Such a threshold can reflect a maximum amount of time that can be allowed to elapse without a blink (e.g., 20 seconds), above which blinking is to be stimulated. Accordingly, upon determining that the referenced blink delay/time interval since the last detected blink exceeds the referenced threshold, one or more blink stimulation actions can be initiated. In certain implementations, various aspects of operation 340 can be performed by wearable device 110 and/or stimulation engine 114, while in other implementations such aspects can be performed by one or more other elements/components, such as those described herein.

The referenced blink stimulation actions can be, for example, instances in which the described actuators 118 of wearable device 100 are triggered or otherwise activated. For example, as shown in FIG. 4, upon determining that the blink rate of user 400 falls below a defined blink rate threshold (or the delay since the user's last blink exceeds a defined blink delay threshold), actuator 218A (e.g., an LED light) can be triggered, thereby flashing light towards eye 402 in order to stimulate blinking. Various other actuators (such as are depicted in FIG. 2B and FIG. 2C and described herein can be similarly triggered/activated).

Moreover, in certain implementations the referenced blink stimulation action(s) can be initiated based on various other factors (e.g., in lieu of and/or in addition to the determined blink rate). For example, in certain implementations such blink stimulation action(s) can be initiated based on the activity that the user can be determined to be engaged in and/or one or more items towards which the eye of the user is determined to be directed. For example, as described above, in addition to determining the blink rate of a user, various sensor(s) 116 can be used to determine an activity that the user is engaged in (e.g., reading, driving, etc.). Accordingly, in a scenario in which the blink rate of the user falls below the described threshold, the activity in which the user is determined to be engaged in can be accounted for in determining when and/or how to initiate the referenced blink stimulation action(s). For example, in a scenario in which the user is determined to be driving, it can be advantageous to adjust and/or delay various blink stimulation action(s) so as not to distract the user while driving. By way of illustration, upon determining that the blink rate of the user falls below the defined threshold while driving, the blink stimulation can be delayed (e.g., by five seconds) (in order to ensure that the user is not being distracted too frequently).

As described above, the referenced blink stimulation action(s) can include actions initiated by actuators 118. One example of such a blink stimulation action is an illumination action, such as the flashing of light (e.g., high-intensity light) towards the eye(s) of the user, in order to stimulate blinking (e.g., as performed by actuator 218A as depicted in FIG. 2A and FIG. 4 and described herein). Another example of such a blink stimulation action is a haptic action, such as tapping, poking, etc. certain regions of the face of the user (e.g., near the eye) and/or stimulating various facial muscles (e.g., via conductive pads) in order to stimulate blinking (e.g., as performed by actuator 218B as depicted in FIG. 2B and described herein). Yet another example of such a blink stimulation action is a pneumatic action, such pressurizing and releasing puffs of air (e.g., by a piezoelectric blower) near the eye of the user in order to stimulate blinking (e.g., as performed by actuator 218C as depicted in FIG. 2C and described herein). As noted above, various other blink stimulation actions can also be employed, such as an auditory action whereby an audio actuator (e.g., a speaker device) projects sound (e.g., towards the ears of the user) in order to stimulate blinking.

Additionally, as noted above, in certain implementations wearable device 110 can be an AR/VR headset. In such a scenario, the referenced blink stimulation action(s) can include actions initiated within such an AR/VR environment (e.g., in conjunction with the technologies that present such AR/VR content). For example, commands, instructions, etc. can be generated to adjust various aspects of a virtual-reality environment. Such commands can be transmitted to and/or executed within the AR/VR device utilized by the user. By way of illustration, such command(s) can adjust various visual aspects of a VR environment in a manner that is likely to stimulate blinking, such as by causing sudden or rapid changes to the light/colors within the VR environment, sudden or abrupt changes to other visual aspects of the VR content being presented (e.g., the sudden introduction of a new character into a game), etc. By way of further example, in certain implementations such command(s) can adjust various audio aspects of a VR environment (e.g., causing a rapid or sudden noise, etc.). By way of further example, such commands can provide a notification or instruction that reminds the user to blink (e.g., flashing the text 'BLINK' on a screen of the wearable device and/or on a connected peripheral device/display).

At operation 350, an operation of one or more sensor(s) 116 can be adjusted. In certain implementations, such operation can be adjusted based on a blink rate or the delay/ interval since the last detected blink instance (e.g., as computed at operation 320). For example, upon determining that a blink rate of a user is at or above the defined blink rate threshold (and thus the referenced blink stimulation actions are not performed or not performed frequently), the described technologies can adjust the operation of various sensors 116, such as the sensors that monitor blinking. By way of illustration, upon determining that a blink rate of a user is at or above the defined blink rate threshold, the sensors 116 that monitor blinking can be configured to operate less frequently (e.g., to sample the blink rate of a user for a period of time, e.g. 30 seconds, and then transition to a 'standby' or 'sleep' operation state for one minute). In doing so, the power from power source 117 that is expended by the wearable device can be reduced. In certain implementations, various aspects of operation 350 can be performed by wearable device 110 and/or monitoring engine 112, while in other implementations such aspects can be performed by one or more other elements/components, such as those described herein.

At operation 360, a log of blink stimulation actions (such as are initiated at operation 340) can be maintained. Such a blink stimulation log can be maintained within log 115 of wearable device 110 and can reflect the various stimulation actions performed (as well as a timestamp corresponding to when such actions were performed). Additionally, such a blink stimulation log can be compared and/or correlated with a blink log that reflects instances of the user blinking. Such a comparison/correlation can reflect whether a particular blink stimulation action is (or is not) effective in causing the user to blink. In certain implementations, various aspects of operation 360 can be performed by wearable device 110 and/or stimulation engine 114, while in other implementations such aspects can be performed by one or more other elements/components, such as those described herein.

At operation 370, a second blink stimulation action can be initiated. In certain implementations, such a blink stimulation action can be initiated based on the log (such as the log of blink stimulation actions as maintained at operation 360). For example, in a scenario in which one blink stimulation action is determined not to be effective in causing a user to blink, a subsequent blink stimulation action can be initiated (immediately and/or after a time delay, e.g., 10 seconds). In certain implementations, various aspects of operation 370 can be performed by wearable device 110 and/or stimulation engine 114, while in other implementations such aspects can be performed by one or more other elements/components, such as those described herein.

By way of illustration, pneumatic actuator 218C (as depicted in FIG. 2C) can be a piezoelectric blower that can pressurize and releasing puffs of air at different intensities, durations, and/or angles (e.g., in relation to different regions of the face of the user, such as above the eye, next to the eye, below the eye, etc.). Accordingly, upon determining (e.g., based on the log of blink stimulation actions referenced above) that a first blink stimulation action of actuator 218C (e.g., a puff of air released at a first intensity, duration, angle, etc.) is not effective to cause the user to blink, a second blink stimulation action (e.g., a puff of air released at a different intensity, duration, angle, etc.) can be initiated. It should also be noted that, in certain implementations, wearable device 110 can incorporate multiple actuator types (e.g., a haptic actuator and a pneumatic actuator), and the use of one actuator can be initiated, for example, upon determining that another actuator is not effective in stimulating blinking by the user.

The referenced techniques can also be employed with respect to the identification of various activities that the user is engaged in and/or content/items that the user is determined to be looking at (e.g., as described above at operation 330). For example, certain blink stimulation actions can be more or less distracting and thus can be more or less suited for certain scenarios (e.g., when a user is driving). Accordingly, upon identifying an action that the user is engaged in, etc., a blink stimulation action that corresponds to/is appropriate for such an activity can be employed.

It should also be noted that while the technologies described herein are illustrated primarily with respect to blink detection, tracking, and stimulation, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-6 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 5 is a block diagram illustrating components of a machine 500, according to some example implementations, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein can be executed. The instructions 516 transform the general, non-programmed machine into a particular machine programmed to carry out the described and illustrated functions in the manner described. In alternative implementations, the machine 500 operates as a standalone device or can be coupled (e.g., networked) to other machines. In a networked deployment, the machine 500 can operate in the capacity of a server machine or a client machine in a server-client network environment, or as a peer machine in a peer-to-peer (or distributed) network environment. The machine 500 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 can include processors 510, memory/storage 530, and I/O components 550, which can be configured to communicate with each other such as via a bus 502. In an example implementation, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 512 and a processor 514 that can execute the instructions 516. The term "processor" is intended to include multi-core processors that can comprise two or more independent processors (sometimes referred to as "cores") that can execute instructions contemporaneously. Although FIG. 5 shows multiple processors 510, the machine 500 can include a single processor with a single core, a single processor with multiple cores (e.g., a multi-core processor), multiple processors with a single core, multiple processors with multiples cores, or any combination thereof.

The memory/storage 530 can include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 can also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions (e.g., instructions 516) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine (e.g., processors 510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 can include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 can include many other components that are not shown in FIG. 5. The I/O components 550 are grouped according to functionality merely for simplifying the following discussion and the grouping is in no way limiting. In various example implementations, the I/O components 550 can include output components 552 and input components 554. The output components 552 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 550 can include biometric components 556, motion components 558, environmental components 560, or position components 562, among a wide array of other components. For example, the biometric components 556 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 can include acceleration sensor components (e.g., accelerometer), gravitation sensor components, rotation sensor components (e.g., gyroscope), and so forth. The environmental components 560 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 562 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 550 can include communication components 564 operable to couple the machine 500 to a network 580 or devices 570 via a coupling 582 and a coupling 572, respectively. For example, the communication components 564 can include a network interface component or other suitable device to interface with the network 580. In further examples, the communication components 564 can include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 570 can be another machine or any of a wide variety of peripheral devices (e.g., a peripheral device coupled via a USB).

Moreover, the communication components 564 can detect identifiers or include components operable to detect identifiers. For example, the communication components 564 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph. MaxiCode. PDF417. Ultra Code, UCC RSS-2D bar code, and other optical codes), or acoustic detection components (e.g., microphones to identify tagged audio signals). In addition, a variety of information can be derived via the communication components 564, such as location via Internet Protocol (IP) geolocation, location via Wi-Fit signal triangulation, location via detecting an NFC beacon signal that can indicate a particular location, and so forth.

In various example implementations, one or more portions of the network 580 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 can include a wireless or cellular network and the coupling 582 can be a Code Division Multiple Access (CDMA) connection, a Global System for Mobile communications (GSM) connection, or another type of cellular or wireless coupling. In this example, the coupling 582 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 can be transmitted or received over the network 580 using a transmission medium via a network interface device (e.g., a network interface component included in the communication components 564) and utilizing any one of a number of well-known transfer protocols (e.g., HTTP). Similarly, the instructions 516 can be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A device comprising:
   a first sensor configured to receive an input, the input corresponding to perceiving one or more blinks of an eye of a user;
   a processor coupled to the first sensor; and
   a memory coupled to the processor and storing instructions that, when executed by the processor, cause the device to perform operations comprising:
   processing the input to determine a blink rate of the user; and
   based on the blink rate, initiating a first blink stimulation action directed to the user, the first blink stimulation action comprising causing pressurization and release of at least one puff of air proximate to an eye of the user;
   maintaining a log of blink stimulation actions; and
   initiating a second blink stimulation action based on the log, wherein the second blink stimulation action comprises causing pressurization and release of at least one additional puff of air proximate to the eye of the user, and wherein the at least one additional puff of air has a different intensity, duration or angle from the at least one puff of air of the first blink stimulation action.

2. The device of claim 1, wherein the memory further stores instructions for causing the device to perform operations comprising determining an activity that the user is engaged in.

3. The device of claim 2, wherein initiating the first blink stimulation action comprises initiating the blink stimulation action based on the blink rate and the activity that the user is engaged in.

4. The device of claim 1, wherein initiating the first blink stimulation action comprises:
   transmitting a command to a virtual-reality device utilized by the user, the command comprising an instruction to adjust an aspect of a virtual-reality environment as presented on the virtual-reality device.

5. The device of claim 4, wherein the aspect of the virtual-reality environment comprises a visual aspects of the virtual-reality environment.

6. The device of claim 4, wherein the aspect of the virtual-reality environment comprises an audio aspects of the virtual-reality environment.

7. The device of claim 1, wherein the first blink stimulation action comprises at least one of: a pneumatic action, an illumination action, a haptic action, or an auditory action.

8. The device of claim 1, further comprising a second sensor configured to perceive an item towards which the eye of the user is directed.

9. The device of claim 8, wherein initiating the first blink stimulation action comprises initiating the first blink stimulation action based on the item towards which the eye of the user is directed.

10. The device of claim 1, wherein the device further comprises an actuator and wherein the first blink stimulation action activates the actuator.

11. The device of claim 1, wherein the memory further stores instructions for causing the device to perform operations comprising adjusting an operation of the first sensor based on the blink rate.

12. A method comprising:
    receiving an input corresponding to one or more blinks of an eye of a user;
    processing the input to determine an elapsed time interval since a blink of the user; and based on the elapsed time interval, initiating a first blink stimulation action directed to the user, the first blink stimulation action comprising causing pressurization and release of at least one puff of air proximate to an eye of the user, wherein the first blink stimulation action activates an actuator, the first blink stimulation action comprising causing, at the actuator, pressurization and release of at least one puff of air proximate to the eye of the user, and wherein the actuator comprises a piezoelectric blower attached to eyeglasses at a temple of the eyeglasses.

13. The method of claim 12, further comprising determining an activity that the user is engaged in.

14. The method of claim 13, wherein initiating a first blink stimulation action comprises initiating a blink stimulation action based on the elapsed time interval and the activity that the user is engaged in.

15. The method of claim 12, further comprising:
maintaining a log of blink stimulation actions; and
initiating a second blink stimulation action based on the log.

16. A device comprising:
a first sensor configured to receive an input, the input corresponding to perceiving one or more blinks of an eye of a user;
a second sensor configured to perceive an item towards which the eye of the user is directed;
an actuator, wherein the actuator comprises a piezoelectric blower attached to eyeglasses at a temple of the eyeglasses;
a processor coupled to the first sensor, the second sensor, and the actuator; and
a memory coupled to the processor and storing instructions that, when executed by the processor, cause the device to perform operations comprising:
processing the input to determine a blink rate of the user; and
based on the blink rate and the item towards which the eye of the user is directed, initiating a first blink stimulation action directed to the user, wherein the first blink stimulation action activates the actuator, the first blink stimulation action comprising causing, at the actuator, pressurization and release of at least one puff of air proximate to an eye of the user.

17. The device of claim 16, wherein the memory further stores instructions for causing the device to perform operations comprising adjusting an operation of at least one of the first sensor or the second sensor based on the blink rate.

18. The device of claim 16, wherein the blink stimulation action comprises at least one of: a pneumatic action, an illumination action, a haptic action, or an auditory action.

19. The device of claim 16, wherein the piezoelectric blower comprises a solenoid or vibration motor.

* * * * *